United States Patent [19]

Jaeckel

[11] Patent Number: 4,775,598

[45] Date of Patent: Oct. 4, 1988

[54] PROCESS FOR PRODUCING HOLLOW SPHERICAL PARTICLES AND SPONGE-LIKE PARTICLES COMPOSED THEREFROM

[75] Inventor: Manfred Jaeckel, Loxstedt, Fed. Rep. of Germany

[73] Assignee: Norddeutsche Affinerie Akitiengesellschaft, Hamburg, Fed. Rep. of Germany

[21] Appl. No.: 126,214

[22] Filed: Nov. 25, 1987

[30] Foreign Application Priority Data

Nov. 27, 1986 [DE] Fed. Rep. of Germany ....... 3640586

[51] Int. Cl.$^4$ .............................................. B22F 3/10
[52] U.S. Cl. ........................................ 428/550; 419/2; 419/5; 419/6; 419/7; 419/9; 419/19; 419/23; 419/35; 419/36; 419/37; 419/64; 419/65; 419/66; 427/216; 427/217; 427/247; 427/227; 428/552; 428/570; 428/403
[58] Field of Search ............... 427/227, 216, 217, 247; 419/2, 5, 6, 9, 7, 64, 19, 65, 23, 66, 35, 36, 37; 428/552, 550, 570, 403

[56] References Cited

U.S. PATENT DOCUMENTS

| | | | |
|---|---|---|---|
| 3,975,194 | 8/1976 | Farmand et al. | 419/5 |
| 4,013,461 | 3/1977 | Elbert | 419/35 |
| 4,293,777 | 11/1981 | Kucza et al. | 419/5 |
| 4,327,154 | 4/1982 | Rossmann | 419/35 |

FOREIGN PATENT DOCUMENTS

| | | |
|---|---|---|
| 0119913 | 9/1984 | European Pat. Off. . |
| 3210770 | 9/1983 | Fed. Rep. of Germany . |
| 3227726 | 10/1983 | Fed. Rep. of Germany . |
| 1266824 | 6/1961 | France . |

*Primary Examiner*—Stephen J. Lechert, Jr.
*Attorney, Agent, or Firm*—Herbert Dubno

[57] ABSTRACT

A process is described in which hollow spheres or hollow-sphere composites (moldings) having high-strength walls are produced. Additional layers are applied to metallized spherical lightweight particles having a core of foamed polymer. In order to increase the strength of the wall of the spherical particle and the strength of the molding, metallized lightweight spherical particles having a metal wall thickness of 5 to 20 microns are treated (coated) with a dispersion of particulate metal or metal oxide or particulate ceramic or refractory material, the lightweight spherical particles coated in a thickness from 15 to 500 microns are dried, the dried particles are heated to a temperature of about 400° C. to effect a pyrolysis of the polymer core, and the particles are subsequently sintered at a temperature from 900° to 1400° C.

15 Claims, 4 Drawing Sheets

PROCESS FOR PRODUCING HOLLOW SPHERICAL PARTICLES AND SPONGE-LIKE PARTICLES COMPOSED THEREFROM

FIELD OF THE INVENTION

My present invention relates to a process for producing hollow spheres or hollow-sphere composites or moldings from substantially spherical metallic lightweight particles.

BACKGROUND OF THE INVENTION

German Patent No. 32 10 770 discloses a process for producing substantially spherical metallic lightweight particles by a wet-chemical metallization of plastic (synthetic resin) particles.

In the known process, foam particles, such as commercially available foam granules, e.g. of polyurethane, are metallized with, e.g. copper or nickel in an electroless process and the plastic cores are decomposed by a pyrolysis at temperatures of about 400° C.

The wall thickness of the particles can be electrolytically increased up to 0.05 mm.

It has been proposed to form moldings from the metallic lightweight spherical particles by sintering them together.

It has also been proposed to use the known hollow metal spheres to make moldings in which hollow metal spheres are incorporated in a matrix consisting of semisolid or hardening materials. The hollow metal spheres may communicate with each other if the individual spheres are open at their points of contact, or the hollow metal spheres are open at their points of contact, or the hollow metal spheres may be separately disposed in the matrix and may be more or less densely packed therein.

OBJECTS OF THE INVENTION

It is an object of my present invention to provide a process for the production of hollow metal spheres or structures consisting of hollow metal sphere composites (molding or molded articles) having walls of high strength and stability.

It is another object of the invention to provide hollow metal sphere composites or structures having walls of high strength, e.g. the densely sintered walls, or also porous walls and a lightweight cell structure which has a large surface area and a high strength.

SUMMARY OF THE INVENTION

These objects are accomplished in accordance with the invention in a process for producing hollow spheres or hollow-sphere composites (articles) having high-strength walls, wherein additional layers are applied to metallized lightweight spherical particles having a core of foamed polymer.

In accordance with the invention metallized lightweight spherical particles having a metal wall thickness of 5 to 20 microns are treated (coated) with a dispersion of particulate metal or metal oxide or particulate ceramic or refractory material.

The lightweight spherical particles coated in a thickness from 15 to 500 microns are dried.

The dried particles are heated to a temperature of about 400° C. to effect a pyrolysis of the polymer core.

The particles are subsequently sintered at a temperature from 900° to 1400° C.

In the process according to the invention, lightweight particles are produced which have a high inherent strength and compressive strength.

The dispersed particles of the dispersion can so be selected as regards their nature and particle size that the walls of the lightweight particles will be porous or densely sintered. The substantially spherical shape of each lightweight particle or of such particle in the composite will be preserved.

With the process of the invention, it is possible to form not only porous or densely sintered walls but the originally existing core cells, which are substantially spherical, may be caused to communicate with each other at their points of contact so that a structure is provided which consists of spherical cells and has macropores and micropores.

In the process in accordance with the invention, the walls of the lightweight particles will usually have micropores if the dispersed particles have a particle size between about 0.04 and 0.3 mm.

Densely sintered walls will be formed if the dispersed particles have a particle size below 0.04 mm, e.g. between $0.000_1$ and $0.0_1$ mm. Suitable sintering aids include, e.g., CaO, $SiO_2$, MgO, $Y_2O_3$.

With numerous ceramic materials, such as alumina, zirconia, the high-melting oxides form low-melting mixed crystals so that liquid phases will form during the sintering.

In the process in accordance with the invention a dispersion of the particles is provided as described. The dispersion medium preferably consists of water or may consist of an organic solvent or of a mixture of said substances.

The dispersion advantageously contains an organic binder which can be burned without a residue. This will facilitate the coating of the primary hollow metal spheres particularly with relatively coarse particles because the adhesion is improved. A multiple coating operation will also be improved.

The concentration of the coating particles in the dispersion generally amounts to 40 to 50% by weight. If the dispersions are sprayable (particle size 0.1 to 50 microns), the hollow metal spheres can advantageously be coated in the fluidized bed. In that case the wall thickness will be determined by the time for which the dispersion is injected.

It will be understood that a plurality of coatings and different coatings can be applied by spraying.

Alternatively, the organic binder may be separately applied in a thickness of up to 0.01 mm to the hollow metal spheres.

For instance, in the production of structures having filtering properties, the hollow metal spheres are suitably coated with layers of relatively coarse particles, which are applied after the hollow metal spheres have been provided with a binder.

When hollow spheres which have thus been pretreated are mixed with a hot powder consisting of relatively coarse particles, the hollow spheres will be covered with a monolayer of coarse powder within a few seconds. That coating operation can be repeated several times to form a multiple coating. Suitable binders are, e.g. polyethylene (LDPE), acrylic resins, polyvinylbutyrals.

Suitable coating materials include metallic and nonmetallic materials. Metallic materials are usually employed in the form of dispersions of one or more metals of the group Fe, Cu, Ni, Cr, W or Ta, particularly iron, copper, nickel, or of oxides of such metals.

Where the oxides of said metals are used the sintering step of the process must be carried out in a reducing atmosphere.

In any case, the sintering operation will cause the wall-forming primary metal of the hollow metal sphere to form an alloy or other intermetallic bond with the metal of the coating.

The end product obtained after the sintering consists, e.g. of a copper-alloyed steel or, e.g., a corrosion-resisting copper-nickel alloy, in each case in the form of a sponge structure which has a low apparent specific gravity and a high strength.

Such sponge structures of copper-alloyed steel or of copper-alloyed nickel are used in the manufacture of platelike bodies for use as filters, porous electrodes, sound-absorbing and shock-absorbing elements and in the manufacture of lightweight building boards.

Dispersions of ceramic and/or refractory materials are suitably employed in the manufacture of hollow metal spheres coated with nonmetallic materials, possibly with the air of an organic binder.

Suitable materials are clay minerals, high-melting oxides, refractory silicates; e.g. alumina, magnesia, titanium dioxide, kaolin, zirconium silicate; also carbides, such as silicon carbide, titanium carbide; nitrides, such as aluminum nitride; silicides, such as molybdenum silicide; and also aluminum phosphate.

The metallized lightweight particles which have been coated one or more times are dried and the dried lightweight particles are heated to about 400° C. for a pyrolysis of the cell core and are subsequently sintered at a temperature from about 900° to 1400° C.

In dependence of the particle size, nature and sintering temperature of the nonmetallic material, the pyrolysis and sintering treatment will result in a formation of dense or porous coatings.

If the metallized lightweight particles which have been coated are sintered in a mold, the product will be an article consisting of substantially spherical sintered together cells which have cell walls that are either porous or more or less densely sintered.

The metal of the metallized primary lightweight particles accumulates in the interior of the cell and unless it is removed by mechanical centrifugation while still molten may be removed by a treatment with mineral acid.

The products produced by the process in accordance with the invention constitute moldings having an open-cell sponge structure. The walls (shells) of the cells of a composite are more of less densely sintered shells of metal or ceramic material, such as $Al_2O_3$, and the core cells communicate with each other at their points of contact. Alternatively, the sintering may result in the formation of a composite consisting of spheres having porous shells of sintered metal or ceramic, virtually a three-dimensional sieve structure consisting of interconnected spherical sieve cages.

A molding (molded article) produced by the process in accordance with the invention has high-strength cell walls, which have a thickness of 15 to 500 microns and consist of sintered particles of ceramic or refractory or of metal particles, which are alloyed by the wall-forming primary metal, wherein the foam structure consists of a composite of optionally communicating, substantially spherical core cells (convex shell cells) and concave-spherical communicating cells (concave shell cells), which are disposed between the core cells, and wherein the cell walls (shells) are porous or densely sintered.

The moldings made by the process in accordance with the invention from hollow metal spheres and a coating material having a defined particle size spectrum can be used particularly for manufacture of pressure-resisting high-strength filters for gases and liquids, particularly for high-temperature filtration, as well as for the manufacture of porous electrodes, soundabsorbing and shock-absorbing elements and for the manufacture of lightweight building boards.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
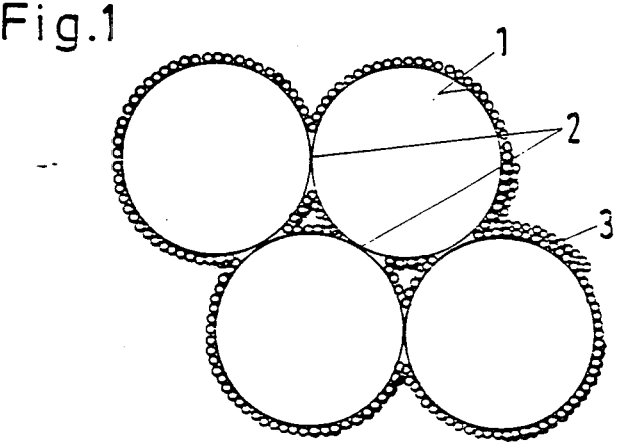
FIGS. 1 through 10 are cross sectional views, greatly enlarged and scaled over the actual dimensions, of particles and sponge-like articles made in accordance with the present invention.

FIG. 1 is an enlarged sectional view showing a composite of metallized hollow spheres before the sintering process. The metal shells 1 consisting, e.g., of copper are in contact at the points of contact 2. The hollow spheres are coated with particles 3 consisting, e.g. of nickel.

Figure 2:
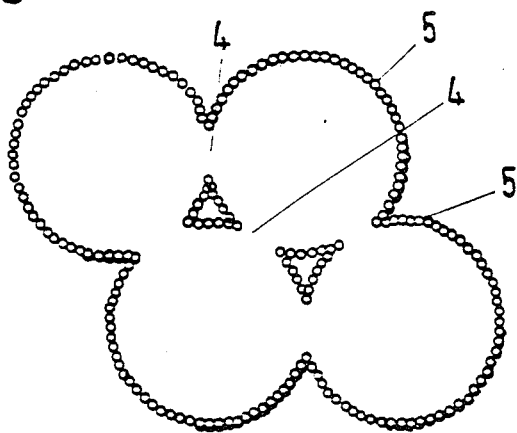

FIG. 2 shows the composite consisting of particle-coated metallized hollow metal spheres after the sintering operation. For instance, a hollow copper sphere coated with nickel particles has been formed with a porous cell wall 5 consisting of a copper-nickel alloy. The cells communicate with each other through contact openings 4.

Figure 3:
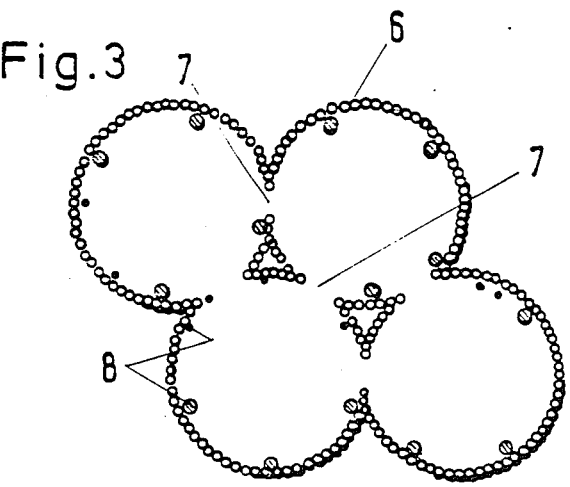

FIG. 3 shows a sintered composite of hollow spheres consisting, e.g. of copper or nickel and have been coated, e.g. with $Al_2O_3$. The cell walls 6 consisting of $Al_2O_3$ particles constitute porous sintered structures. The metal shells which have been melted during the sintering operation and consist, e.g. of Cu or Ni, have been fused together to form globules 8 in the cells. The cells communicate with each other through the openings 7.

Figure 4:
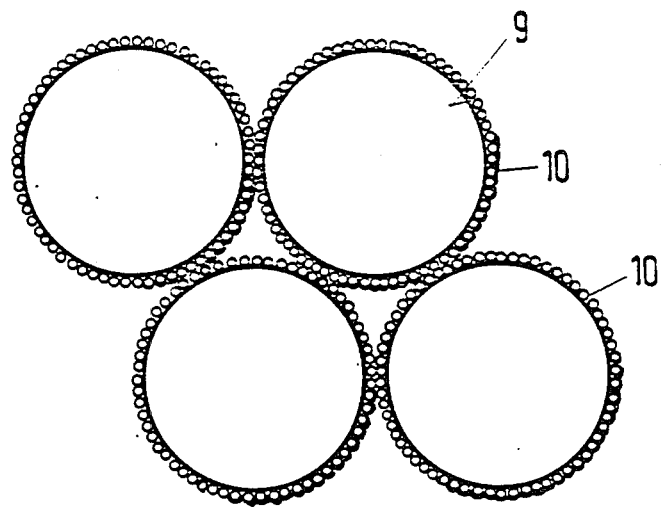

FIG. 4 shows an unsintered composite consisting of hollow spheres 9 of metal, such as copper, which have been coated with a layer of a metal powder 10, such as nickel.

Figure 5:
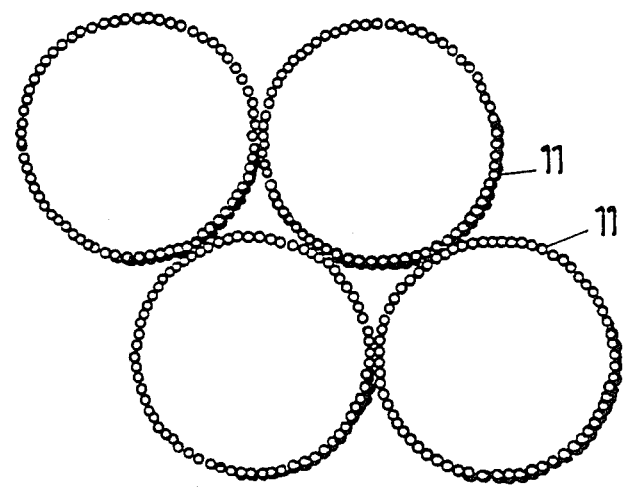

FIG. 5 shows the sintered composite formed by the hollow metal spheres of FIG. 4 and illustrates that porous, strong spherical shells or cell walls 11 have been formed, which consist of particles of a copper-nickel alloy.

Figure 6:
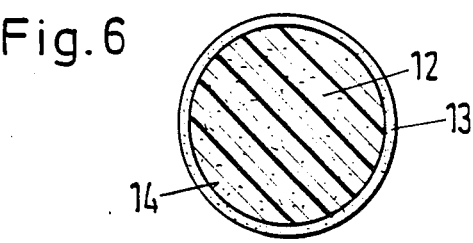

FIG. 6 shows a single lightweight particle having a spherical core 12 consisting of a foamed polymer, such as foamed polystyrene, and coated in a thickness from 5 to 20 microns with a metal layer 14 consisting, e.g. of copper or nickel. 13 designates a layer which consists of a sinterable metal or its oxide in a thickness of about 50 to 100 microns.

Figure 7:
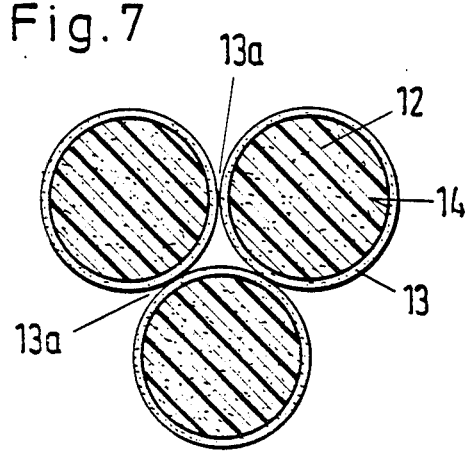

FIG. 7 shows a pile of the lightweight particles of FIG. 6 before the pyrolysis and before the dense sintering. The coatings 13 consisting, e.g. of nickel or iron powder, contact each other in the regions 13a.

Figure 8:
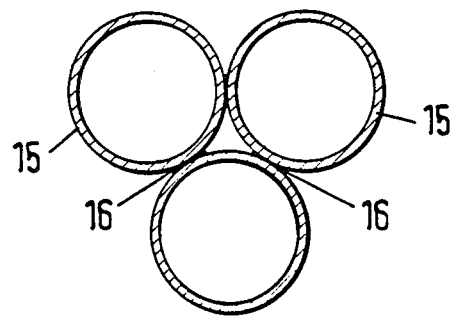

FIG. 8 shows the pile of FIG. 7 after the pyrolysis and the sintering process. The layers 13, 14 have been transformed into densely sintered shells 15 consisting of a metal alloy (Cu/Ni, Cu/Fe or Ni/Fe) and joined by sinter bridges 16.

Figure 9:
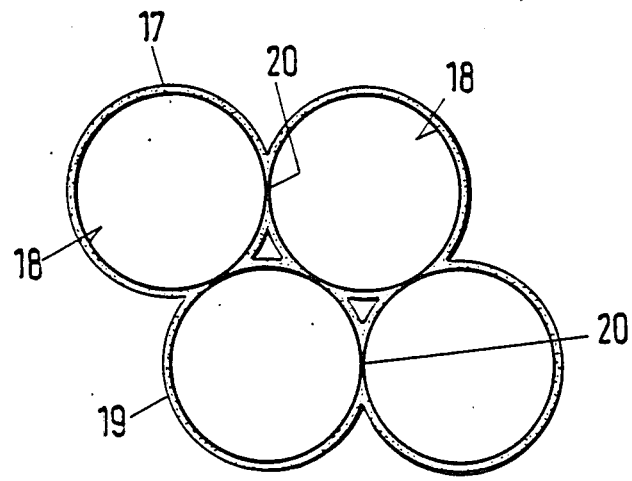

FIG. 9 shows an unsintered pile of hollow spheres 19, which consist of metals and have walls 18 consisting of, e.g. nickel or copper and covered with a layer 19, e.g. of Al$_2$O$_3$ powder. The contacting regions of the hollow metal spheres are designated 20.

Figure 10:
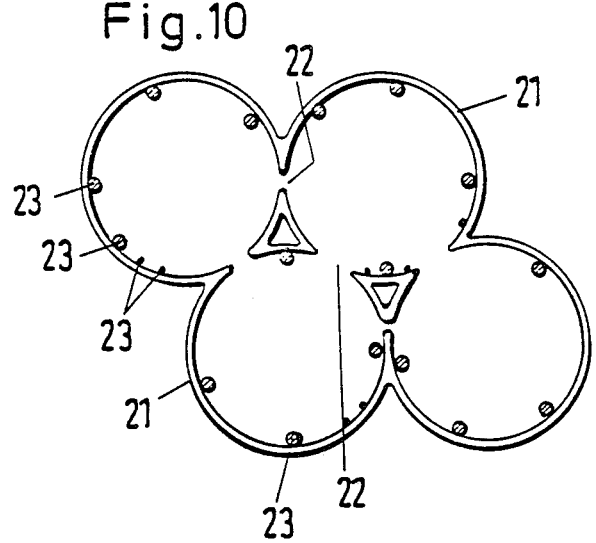

FIG. 10 shows the pile of FIG. 9 after the sintering process. 21 designates a densely sintered, compact layer or cell wall consisting, e.g. of alumina. The contacting regions of the cell walls 21 have been expanded to form contact holes or passages 22 between cells. The fused metal globules 23 which have been formed during the sintering and consist, e.g. of the nickel or copper of the original hollow sphere of metal are disposed inside the cell on the cell wall 21.

In the production of lightweight particles as shown in FIG. 6, metallized spheres of foamed polymer, which are 1 to 10 mm in diameter and consist, e.g. of foamed polystyrene spheres coated with copper or nickel, are treated in a fluidized bed unit with an aqueous dispersion of a sinterable metal or of its oxide. That dispersion contains also an organic binder. The coated and dried product is withdrawn. Alternatively, a pyrolyzed product, such as a hollow sphere of metal, may be used.

In the manufacture of high-strength molded articles as shown in FIGS. 7 and 8, lightweight particles of the kind described above are charged into a suitable mold and are compacted by being vibrated. A slight pressure may be applied to ensure a good contact between the spheres.

If there foamed polymer is still contained in the hollow spheres of metal, the filled mold is then heated to about 400° to 600° C. so as to pyrolyze the polymer.

That mold is subsequently heated to a temperature from 900° to 1400° C. in order to sinter the molding, whereby sinter bridges are formed at the points of contact of the spheres.

If the hollow sphere of metal or the lightweight particle is coated with a metal powder, such as copper, the coating and the sintering of the molding are effected under an inert gas.

If the coating consists of an oxide of the desired metal, such as nickel oxide, the coating may initially be applied in the presence of air so that a layer of copper oxide and nickel oxide is formed and is subsequently transformed into a copper-nickel alloy under reducing conditions.

In the manufacture of high-strength moldings as shown in FIGS. 9 and 10, which moldings consist of an open-cell ceramic sponge structure, metallized spheres of foamed polymer, such as copper-coated spheres of foamed polystyrene, are charged into a mold, which may be sievelike, and are compacted by being vibrated.

The mold is subsequently filled with a dispersion of a ceramic material, e.g., with a kaolin slip, or the mold is dipped into such dispersion and surplus dispersion is subsequently permitted to run off. This results in the formation of a filmlike coating 19, which is diagrammatically shown in FIG. 9.

The mold and its contents are subsequently dried at 105° C. so that the molding attains an adequate green strength and can not be removed from the mold and subjected to a pyrolysis and to a dense sintering at 900° to 1400° C. The metal of the original sphere wall has been fused to form globules or small reguli and is removed in that the molding is treated with mineral acid.

I claim:

1. A process for making hollow spherical particles, comprising the steps of:
    (a) providing metallized lightweight spherical bodies from cores of a foamed polymer with a metallic coating of a thickness of 5 to 20 microns;
    (b) coating said metallized lightweight spherical bodies with a dispersion of at least one particulate material selected from the group which consists of metals, metal oxides, ceramics and refractories to a dispersion coating thickness of 15 to 500 microns;
    (c) drying the dispersion coating on said metallized lightweight spherical bodies to form a dry layer of said material thereon;
    (d) heating said metallized lightweight spherical bodies with said dry layer of said material thereon to a temperature of about 400° C. to pyrolyze said polymer cores and form hollow bodies essentially consisting of said metallic coatings and said dry layers of said material thereon; and
    (e) subjecting said hollow bodies essentially consisting of said metallic coatings and said dry layers of said material thereon to a sintering temperature of 900° C. to 1400° C. for a period sufficient to sinter the material of the respective layer and the respective layer to the respective metallic coating, thereby forming hollow spherical particles.

2. The process defined in claim 1 wherein, for step (b), an organic binder capable of thermal decomposition without residue is incorporated in said dispersion.

3. The process defined in claim 1 wherein, for step (b), said dispersion is formed from at least one particulate metal selected from the group which consists of Fe, Cu, Ni, Cr, W and Ta, or at least one oxide thereof.

4. The process defined in claim 1 wherein, for step (b), said dispersion is formed from at least one ceramic or refractory.

5. The process defined in claim 1 wherein, for step (b), said dispersion is formed from particles of said material having a particle size of about 0.1 to 500 microns.

6. The process defined in claim 1 wherein, for steps (d) and (e), said metallized lightweight spherical bodies with said dry layer of said material thereon are vibrated into a mold and pyrolyzed at a temperature of about 400° C. and the resulting hollow bodies essentially consisting of said metallic coatings and said dry layers of said material thereon are then sintered by being heated to a temperature of 900° C. to 1400° C.

7. The process defined in claim 1 wherein said material consists of a ceramic or refractory, further comprising the step of:
    (f) treating the particles of step (e) with acid to remove the metal of said metallic coatings therefrom.

8. A process for making a molded article, comprising the steps of:
    (a) providing metallized lightweight spherical bodies from cores of a foamed polymer with a metallic coating of a thickness of 5 to 20 microns;
    (b) coating said metallized lightweight spherical bodies with a dispersion of at least one particulate material selected from the group which consists of metals, metal oxides, ceramics and refractories to a dispersion coating thickness of 15 to 500 microns;
    (c) drying the dispersion coating on said metallized lightweight spherical bodies to form a dry layer of said material thereon;

(d) vibrating the metallized lightweight spherical bodies with said dry layers of said material thereon into a mold having a shape corresponding to that of said article;

(e) heating said metallized lightweight spherical bodies with said dry layer of said material thereon in said mold to a temperature of about 400° C. to pyrolyze said polymer cores and form hollow bodies essentially consisting of said metallic coatings and said dry layers of said material thereon; and (f) subjecting said hollow bodies essentially consisting of said metallic coatings and said dry layers of said material thereon in said mold to a sintering temperature of 900° C. to 1400° C. for a period sufficient to sinter the material of the respective layer and the respective layer to the respective metallic coating, thereby forming hollow spherical particles and to sinter said hollow spherical particles together into said article.

9. Hollow spherical particles as made by the process of claim 1.

10. The article made by the process of claim 1.

11. An article consisting essentially of hollow spherical particles sintered together and having an open sponge structure, each of said particles consisting of a layer of sintered particulate material selected from the group which consists of metals, metal oxides, ceramics and refractories in a thickness of 15 to 500 microns bonded to the exterior of a metallic shell.

12. The article defined in claim 11 wherein said shell has a thickness of 5 to 20 microns.

13. The article defined in claim 12 wherein said material consists of at least one particulate metal selected from the group which consists of Fe, Cu, Ni, Cr, W and Ta, or at least one oxide thereof.

14. The article defined in claim 12 wherein said material consists of at least one ceramic or refractory.

15. The article defined in claim 12 wherein said material consists of particles of said material having a particle size of about 0.1 to 500 microns.

* * * * *